United States Patent

Walters

Patent Number: 5,529,386
Date of Patent: Jun. 25, 1996

[54] HUB STRAP

[76] Inventor: George M. Walters, 179 Mason St., Staten Island, N.Y. 10304

[21] Appl. No.: 249,336

[22] Filed: May 27, 1994

[51] Int. Cl.$^6$ ............................................. B60B 7/06
[52] U.S. Cl. ............................ 301/108.1; 301/37.1
[58] Field of Search .................. 301/37.1, 37.21, 301/37.28, 37.31, 37.34, 37.41, 108.1, 108.2, 108.3, 108.4; 70/225, 226, 259, 260

[56] References Cited

U.S. PATENT DOCUMENTS

| | | | |
|---|---|---|---|
| 1,037,814 | 9/1912 | Whitney | 301/108.1 |
| 2,328,339 | 8/1943 | Heath | 301/108.1 X |
| 3,965,708 | 6/1976 | Smiley | 70/166 |
| 4,290,283 | 9/1981 | Labrecque | 70/167 |
| 4,547,021 | 10/1985 | Abbate Daga | 301/37.35 |
| 4,781,419 | 11/1988 | Boothe | 301/108.3 |
| 4,974,909 | 12/1990 | Patti et al. | 301/108.1 X |

*Primary Examiner*—Russell D. Stormer
*Attorney, Agent, or Firm*—Michael I. Kroll

[57] ABSTRACT

A hub strap is provided to secure a wheel cover, having narrow openings to a wheel rim having slots for a tire mounted thereto. The hub strap consists of a belt to extend through two slots in the wheel rim and two narrow openings in the wheel cover. An assembly is for connecting opposite ends of the belt together in a removable manner. The belt will secure the wheel cover to the wheel rim to eliminate loss and damage to the wheel cover.

11 Claims, 2 Drawing Sheets

HUB STRAP

BACKGROUND OF THE INVENTION

1. Field of the Invention

The instant invention relates generally to hub cap securing devices and more specifically it relates to a hub strap.

2. Description of the Prior Art

Numerous hub cap securing devices have been provided in prior art. For example U.S. Pat. Nos. 3,965,708 to Smiley; 4,290,283 to Labrecque; 4,547,021 to Daga and 4,781,419 to Boothe all are illustrative of such prior art. While these units may be suitable for the particular purpose to which they address, they would not be as suitable for the purposes of the present invention as heretofore described.

SMILEY, DON A.
HUB CAP LOCKING DEVICE
U.S. Pat. No. 3,965,708

A hub cap locking device is provided. A spoke hub cap cooperates with a hub-covering shell and a lock-carrying cap. Engagement and removal of the hub cap is controlled by key-actuation of the lock.

LABRECQUE, CLOVIS
HUB CAP LOCK DEVICE
U.S. Pat. No. 4,290,283

A hub cap lock device adapted to be installed upon the air valve of a vehicle wheel tire or upon a threaded stud projecting from the wheel includes a housing with an internal cavity. Means are provided at one end of the housing for securing the housing to the wheel part. A cap member is mounted at the opposite end of the housing for engagement with the hub cap. The cap has a flange portion with a dimension slightly greater than a hole in the hub cap. A lock engagedly received in the housing secures the cap member to the housing, thereby preventing unauthorized removal of the hub cap.

DAGA, SIVANO ABBATE
HUB CAP SECURING ARRANGEMENT
ENGAGING WHEEL LUGS
U.S. Pat. No. 4,547,021

A disc wheel for motor vehicles, including a disc defining equi-angularly spaced holes, screws for fixing the wheel to its support and engageable in the holes, and a hub cap attached to the disc. The improvement consists in the disc and the hub cap having cooperating bayonet-type connection means for connecting the hub cap to the fixing screws of the wheel.

BOOTHE, RALPH T.
HUB CAP LOCKING ARRANGEMENT
U.S. Pat. No. 4,781,419

A hub cap locking arrangement, in which, in a first embodiment, a hub cap has a cup-shaped configuration with a generally tubular portion insertable into the wheel hub opening. The tubular portion has a diameter slightly smaller than the diameter of the wheel hub opening of an alloy vehicle wheel. The hub cap may be formed from cast or machined metal or plastic material and is provided with a plurality of radially extending threaded apertures, through which extend pointed threaded menders of high strength metal. The threaded members have either a hex head opening or a slotted end. The hub cap is assembled to the wheel from the rear with the wheel removed from the vehicle. The threaded fasteners are then screwed into the apertures form the inner opening of the hub cap until the pointed ends enter into engagement with the inner wall of the wheel hub. In a second embodiment for use with factory provided hub caps, a metal locking ring is provided for insertion within the shallow cup-shaped sheet metal member of the factory hub cap. The locking ring is provided with a plurality of equi-angularly disposed spaced threaded apertures through which pass pointed threaded fasteners of high strength metal for partially penetrating and deforming the sheet metal member material into engagement with the interior abutting wall portion of the wheel hub.

SUMMARY OF THE INVENTION

A primary object of the present invention is to provide a hub strap that will overcome the shortcomings of the prior art devices.

Another object is to provide a hub strap that will secure a wheel cover to a wheel rim, so that in the event of a rough road condition having pot holes, the loss or damage to the wheel cover will be eliminated.

An additional object is to provide a hub strap that will reduce the cost of replacing the wheel cover, while it would minimize the potential highway safety or environmental issues associated with clean up of wheel covers from the roads.

A further object is to provide a hub strap that is simple and easy to use.

A still further object is to provide a hub strap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
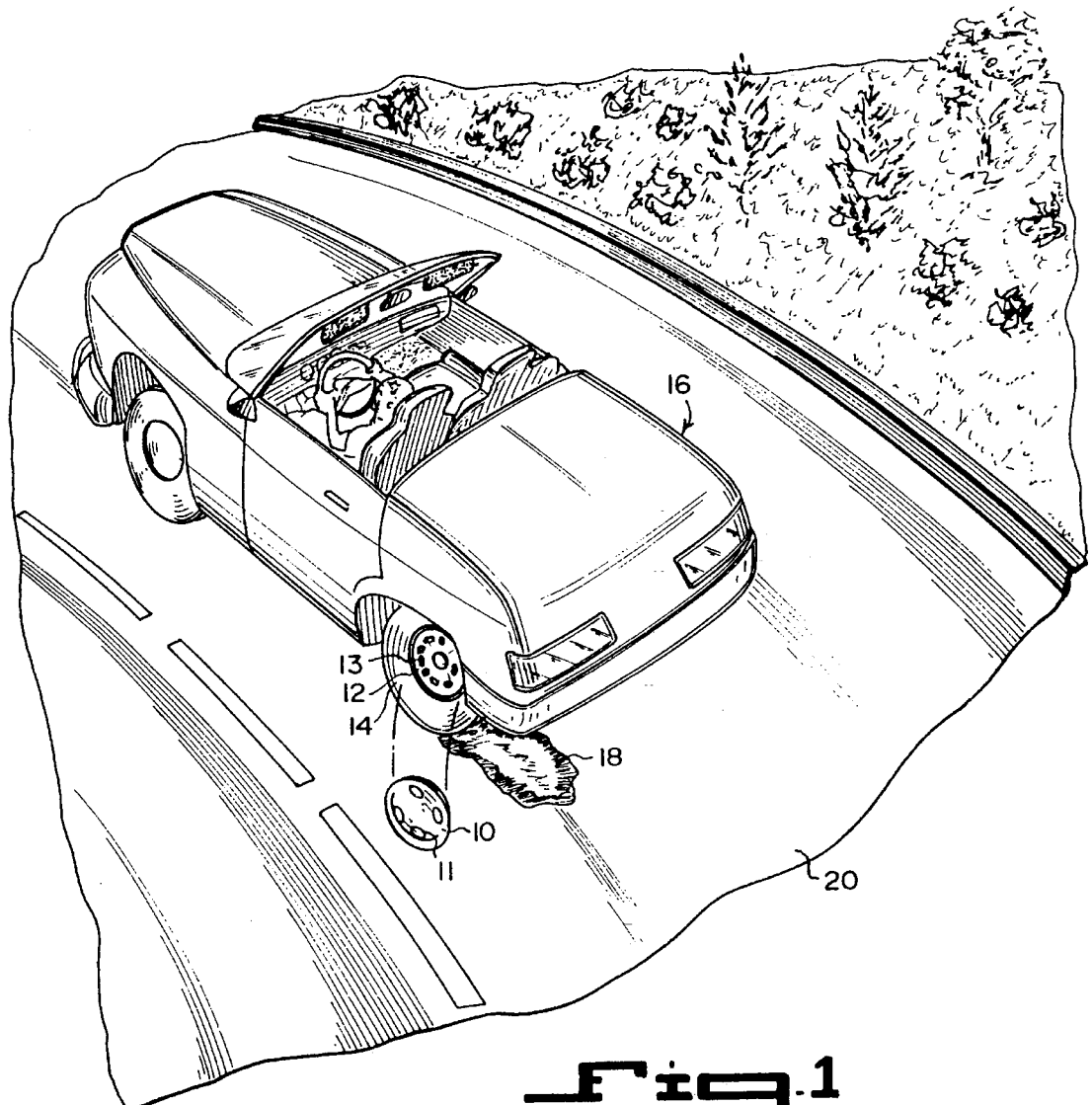
FIG. 1 is a perspective view of the prior art, showing a wheel cover disengaging from a wheel rim of a motor vehicle, when traveling over a pothole in the road.
Figure 2:
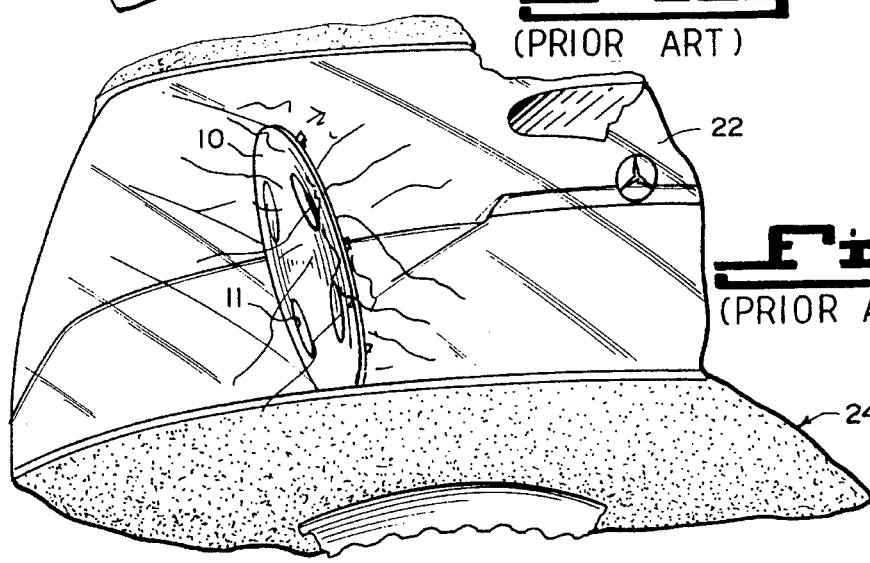
FIG. 2 is a perspective view of the prior art, showing the disengaged wheel cover contacting and braking a windshield of a second motor vehicle, traveling behind the first motor vehicle in FIG. 1.

Turning now descriptively to the drawings, in which similar reference characters denote similar elements throughout the several views, FIGS. 1 and 2 illustrate the prior art. FIG. 1 shows a wheel cover 10 being disengaged from a wheel rim 12, when a tire 14 of a motor vehicle 16 goes over a pothole 18 in a roadway 20. FIG. 2 shows the wheel cover 10 going into and breaking a windshield 22 of a second motor vehicle 24 that is traveling behind the motor vehicle 16 in FIG. 1.

Figure 3:
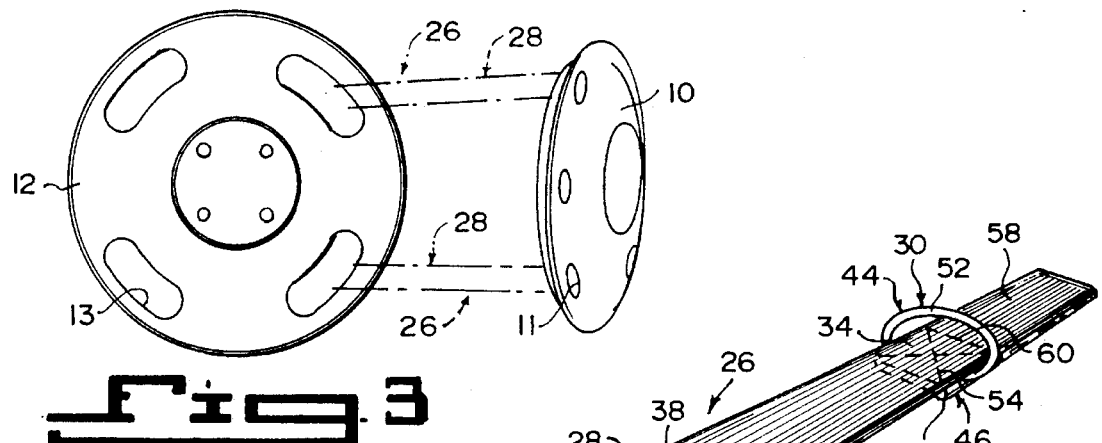
FIG. 3 is a front view of a wheel rim with the wheel cover in perspective exploded therefrom and showing in phantom and diagramatically, how the instant invention is installed thereto.
Figure 4:
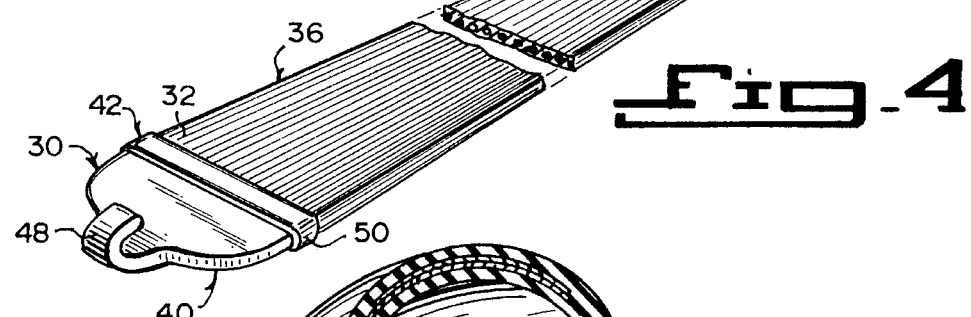
FIG. 4 is a perspective view with parts broken away of the instant invention per se in an extended flat position.
Figure 5:
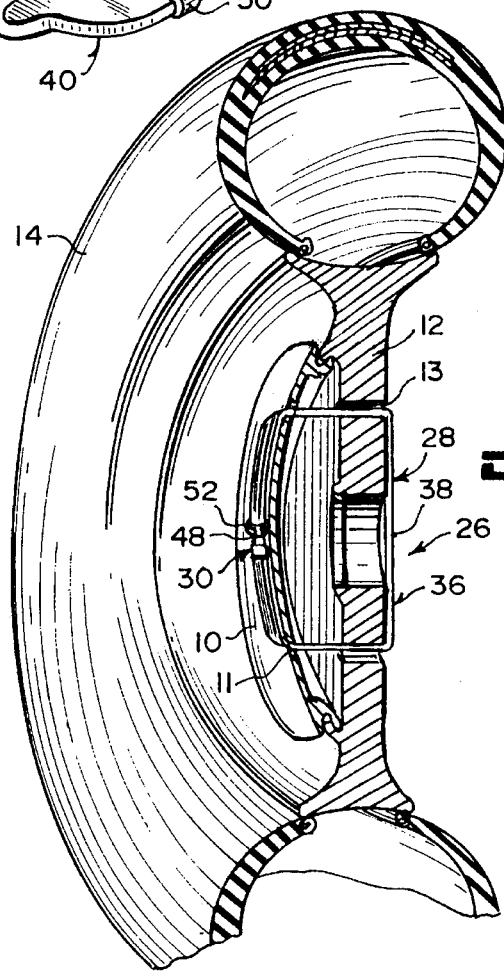
FIG. 5 is a perspective view partly in cross section and broken away of a wheel assembly, showing how the instant invention is installed to maintain the wheel cover to the wheel rim.

The instant invention, as shown in FIGS. 3 through 5, is a hub strap 26 to secure a wheel cover 10, having narrow openings 11 to the wheel rim 12, having slots 13 for a tire 14 mounted thereto. The hub strap 26 consists of a belt 28 to extend through two slots 13 in the wheel rim 12 and two narrow openings 11 in the wheel cover 10. An assembly 30 is for connecting opposite ends 32, 34 of the belt 28 together in a removable manner. The belt 28 will secure the wheel cover 10 to the wheel rim 12 to eliminate loss and damage to the wheel cover.

The belt 28 is an elongated band 36 sized to enter two slots 13 in the wheel rim 12 and two narrow openings 11 in the wheel cover 10. The elongated band 36 is fabricated out of an elastic webbing material 38.

The removable connecting assembly 30 includes a first closure member 40. A structure 42 is for attaching the first closure member 40 to a first end 32 of the elongated band 36. A second closure member 44 is also provided. A unit 46 is for affixing the second closure member 44 to a second end 34 of the elongated band 36. The first closure member 40 and the second closure member 44 can engage and disengage from each other for quick assembly and disassembly.

The first closure member 40 is a latch hook 48. The attaching structure 42 is a ferrule 50 between the latch hook 48 and the first end 32 of the elongated band 36.

The second closure member 44 is a latch ring 52. The affixing unit 46 is the second end 34 of the elongated band 36 folded over the latch ring 52 and stitched together at 54 forming a lap joint 56. A pull through finger grip tab portion 58 is integral with and has perforations along its connected end 60 with the lap joint 56. The tab portion 58 can be removed after the latch hook 48 is in engagement with the latch ring 52.

The latch hook 48 and the ferrule 50 are fabricated out of stainless steel 62. The latch ring 52 is also fabricated out of stainless steel 62.

Operation of the Invention

To use the hub strap 26, the following steps should be taken:

1. Install the wheel cover 10 to the wheel rim 12.

2. Insert the elongated band 36 through a first narrow opening 11 in the wheel cover 10 and an aligned first slot 13 in the wheel rim 12.

3. Hold the finger grip tab portion 58.

4. Pull the elongated band 36 around behind the wheel rim 12.

5. Place the elongated band 36 through a second slot 13 in the wheel rim 12 and an aligned second narrow opening 11 in the wheel cover.

6. Attach the latch hook 48 to the latch ring 52.

7. Remove the tab portion 58 by braking the perforations 60 between the end of the tab portion 58 and the lap joint 56.

8. For best results use two more hub straps 26 and repeat steps 1 through 7 twice.

List of Reference Numbers 10 wheel cover
11 narrow opening in 10
12 wheel rim
13 slot in 12
14 tire
16 first motor vehicle
18 pothole
20 roadway
22 windshield
24 second motor vehicle
26 hub strap
28 belt
30 removable connecting assembly
32 first end of 28
34 second end of 28
36 elongated band for 28
38 elastic webbing material for 36
40 first closure member
42 attaching structure
44 second closure member
46 affixing unit
48 latch hook for 40
50 ferrule for 42
52 latch ring for 44
54 stitching
56 lap joint
58 finger grip tab portion
60 perforations between end of 58 and 56
62 stainless steel for 48, 50 and 52

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A wheel cover assembly for securing a wheel cover to a wheel rim which has a plurality of slots formed therein, said wheel cover assembly comprising:

a) a wheel cover having a plurality of openings formed therethrough;

b) a belt extending through said slots in the wheel rim and said openings in the wheel cover; and c) means for connecting opposite ends of said belt together in a removable manner, so that said belt will secure the wheel cover to the wheel rim to eliminate loss and damage to the wheel cover.

2. A hub strap as recited in claim 1, wherein said belt is an elongated band sized to enter two said slots in the wheel rim and two said narrow openings in the wheel cover.

3. A hub strap as recited in claim 2, wherein said elongated band is fabricated out of an elastic webbing material.

4. A hub strap as recited in claim 3, wherein said removable connecting means includes:

a) a first closure member;

b) means for attaching said first closure member to a first end of said elongated band;

c) a second closure member; and d) means for affixing said second closure member to a second end of said elongated band, so that said first closure member and said second closure member can engage and disengage from each other for quick assembly and disassembly.

5. A hub strap as recited in claim 4, wherein said first closure member is a latch hook.

6. A hub strap as recited in claim 5, wherein said attaching means is a ferrule between said latch hook and the first end of said elongated band.

7. A hub strap as recited in claim 6, wherein said second closure member is a latch ring.

8. A hub strap as recited in claim 7, wherein said affixing means is the second end of said elongated band folded over said latch ring and stitched together forming a lap joint.

9. A hub strap as recited in claim 8, further including a pull through finger grip tab portion integral with and having perforations along its connected end with said lap joint, so that said tab portion can be removed after said latch hook is in engagement with said latch ring.

10. A hub strap as recited in claim 9, wherein said latch hook and said ferrule are fabricated out of stainless steel.

11. A hub strap as recited in claim 10, wherein said latch ring is fabricated out of stainless steel.

* * * * *